May 15, 1962 H. H. WOLFF 3,035,135
RELAYS AND SOLENOIDS
Filed June 21, 1955 11 Sheets-Sheet 1

INVENTOR.
HANNS H. WOLFF
BY
Mason, Kolte, Cause & Berry
ATTORNEY.

May 15, 1962  H. H. WOLFF  3,035,135
RELAYS AND SOLENOIDS
Filed June 21, 1955  11 Sheets-Sheet 2

INVENTOR.
HANNS H. WOLFF
BY
Moses, Nolte, Crews & Berry
ATTORNEYS

May 15, 1962 H. H. WOLFF 3,035,135
RELAYS AND SOLENOIDS
Filed June 21, 1955 11 Sheets-Sheet 3

INVENTOR.
HANNS H. WOLFF
BY
Moses, Nolte, Crews & Berry
ATTORNEYS

May 15, 1962 H. H. WOLFF 3,035,135
RELAYS AND SOLENOIDS
Filed June 21, 1955 11 Sheets-Sheet 7

INVENTOR.
HANNS H. WOLFF
BY
Moses, Nolte, Crews & Berry
ATTORNEYS

May 15, 1962 H. H. WOLFF 3,035,135
RELAYS AND SOLENOIDS
Filed June 21, 1955

INVENTOR.
HANNS H. WOLFF
BY
ATTORNEYS

May 15, 1962 H. H. WOLFF 3,035,135
RELAYS AND SOLENOIDS
Filed June 21, 1955 11 Sheets-Sheet 10

INVENTOR.
HANNS H. WOLFF
BY
Thoren, Nolte, Crews & Berry
ATTORNEYS

May 15, 1962  H. H. WOLFF  3,035,135
RELAYS AND SOLENOIDS
Filed June 21, 1955  11 Sheets-Sheet 11

INVENTOR.
HANNS H. WOLFF
BY
Moses, Nolte, Crews & Berry
ATTORNEYS

United States Patent Office 3,035,135
Patented May 15, 1962

3,035,135
RELAYS AND SOLENOIDS
Hanns H. Wolff, Matawan, N.J., assignor, by mesne assignments, to Daco Instruments Company, Brooklyn, N.Y., a partnership of New York
Filed June 21, 1955, Ser. No. 517,027
13 Claims. (Cl. 200—87)

This invention relates to electrical relays and solenoids, and more particularly to rotary, alternating current relay actuators and solenoids.

It is a primary object of the invention to provide a novel arrangement of two coils on a physically closed ring which are separated by two pole pieces, thereby preventing a slipping off of the coils from the structure. This provides a resistance against shock and vibration.

The arrangement referred to, moreover, has the advantage that it can be used as a phase indicating device, for example, for phasing relays which operate only if two A.C. voltages, each energizing one of the two coils, have the proper phase relationship. Such relays are used to connect several generators to the same power distribution system.

It is a primary object to provide a solenoid or relay of such sturdy construction that it can effectively withstand the most severe conditions of external shock and vibration to which devices of this kind may be subjected in use.

In alternating current relay actuators and solenoids there is a constant variation of flux as the current builds up to a maximum in one direction, recedes to zero, builds up to a maximum in the other direction, and again recedes to zero. This causes vibration and chattering as the contact controlling rotor moves to fully actuated position and recedes in alternation. The vibration and chattering tend to loosen and disorganize the coils, to impair the intended electrical connections, and in general to loosen screws wherever they may be present in the structure.

It is an important object of the invention to assure retention of the coils in their original positions and condition, in proper relation to the stator, by winding them directly on the stator ring in such relation to the ring that they cannot come off.

It is a further object to improve the contacts which are controlled by, and form parts of, alternating current relays.

To this end it is a feature that spring contacts are employed with one contact of each engageable pair in the form of a strip, divided to form side by side tongues of different widths, the arrangement being such that the tongues will have dissonant characteristic vibration frequencies, and the rhythmic building up of large amplitude vibrations will be avoided.

It is a further feature that the spring contacts are so constructed and arranged that they will have firm engagement with one another throughout an extensive range of angular movement. By this means the control circuits are maintained notwithstanding oscillation of the contact controlling rotors.

It is a further object to secure different desired operating characteristics through variations of the stator-rotor relationship.

Other objects and advantages will hereinafter appear.

In the drawing forming part of this specification.

Each of FIGURES 20 to 24, inclusive, is an elevation view showing a further modified stator-rotor combination employed in a solenoid.

In FIGS. 1 to 4 disclosure is made of a practical and advantageous alternating current, relay actuator embodying features of the invention.

The novel actuator includes a casing 10 which comprises a flanged cylindrical body member 12 and flanged end members 14 and 16. Plates 18 and 20 extend across the casing, the outer margin of plate 18 being received between outturned flanges of the members 12 and 14, and the outer margin of the plate 20 being received between outturned flanges of the members 12 and 16. The casing members thus far referred to are secured together by headed screws 22. The casing member 12 is integrally provided with supporting feet 24, and constitutes the carrier for all of the other structure illustrated.

Plates 26 and 28 are dispose contiguous to the plates 18 and 20, respectively, and are secured to the casing member 12 by headed screws 30. The plates 26 and 28 support lower and upper ball bearings 32 and 34 in which a central shaft 36 is revolubly mounted. The shaft 36 extends at its lower end down into the casing member 14. The lower end of the shaft has keyed to it a flanged collar 38 which forms a hub for a disc 40. The collar 38 is supported on a washer 42 and the washer 42 is supported, in turn, by the head of a screw 44, which screw is threaded axially upward into the lower end of the shaft and causes the collar 38 to be pressed upward against a fixed collar 46. A volute spiral spring 48 is secured at its outer end to the casing member 14 through a screw 50, and is secured at its inner end, through a pin 52, to the disc 40. The spring tends to bias the shaft 36 in a counter-clockwise direction to the position illustrated in FIG. 5.

The shaft 36 has fixed upon it a highly permeable, laminated armature member 48. The armature member 48 is supported upon a collar 50, which collar is pinned to the shaft 36 by a tapered pin 52. The armature member bears upward against a split ring 54 which fits in a circumferential groove of the shaft. The armature is secured for rotation in unison with the collar 50 by screws 56.

The relay also includes a stator 58. The stator comprises a laminated ring 60 of high permeability which is supported in arcuate rabbets formed in the inner margins of inwardly disposed flanges 62 of the casing member 12. The ring 60 is secured to the flanges 62 by screws 64. It is also clamped against the flanges 62 by clamping plates 66 and associated headed screws 68, the latter having their shanks threaded into the flanges 62.

Figure 1:
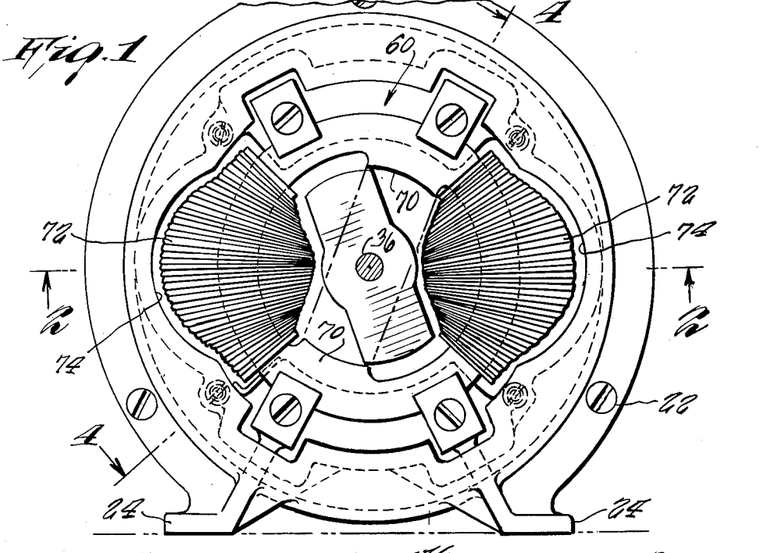
FIG. 1 is a view in sectional elevation of a rotary, alternating current relay actuator embodying features of the invention, the view being taken on the line 1—1 of FIG. 2, looking in the direction of the arrows.
Figure 2:
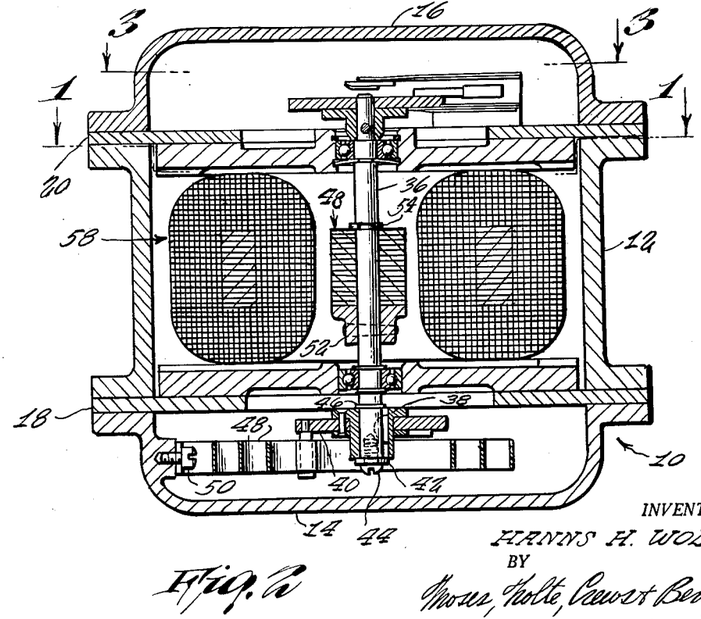
FIG. 2 is a horizontal sectional view taken on the line 2—2 of FIG. 1 looking in the direction of the arrows.

As seen in FIG. 1, the ring 60 is formed with inwardly extending pole pieces 70 which are disposed diametrically opposite one another. Coils 72 of insulated wire are wound on the ring 60 in diametrically opposed sectors thereof. It will be observed that each coil 72 is made small at the ends but bulges in the center. The arrangement enables coils of great length and numerous turns to be employed in conjunction with an armature of the shape shown and having a comparatively narrow range of movement.

The bulge at the inner side of each winding presents substantially straight sides which form an angle with one another substantially supplementary to the angular range of movement of the armature. The corresponding bulge at the outer side of each winding is accommodated by recesses 74 formed in the casing member 12.

Figure 3:
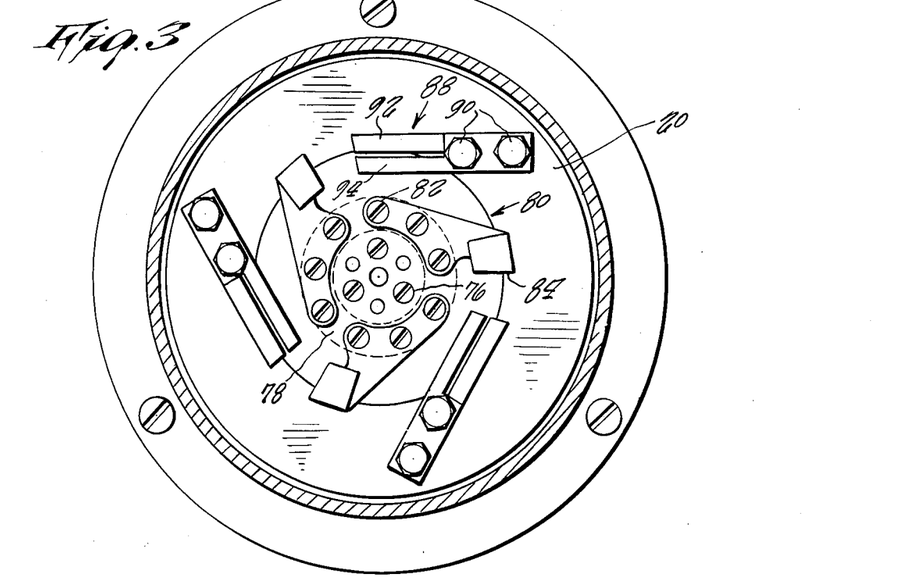
FIG. 3 is a horizontal sectional view taken on the line 3—3 of FIG. 2, looking in the direction of the arrows, the relay illustrated being a three pole, single throw relay.
Figure 4:
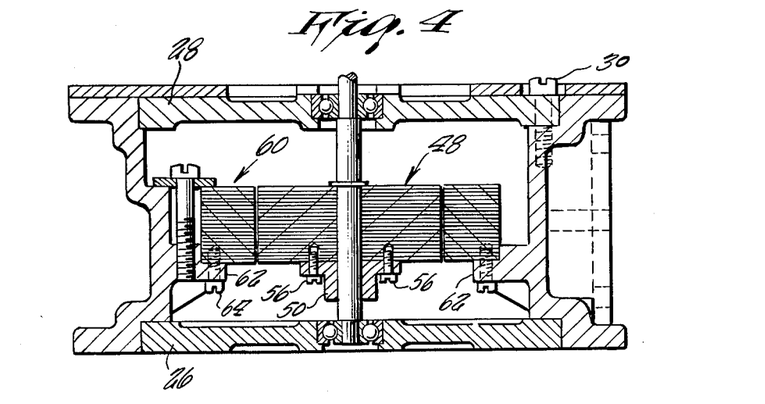
FIG. 4 is a transverse sectional view taken on the line 4—4 of FIG. 2, looking in the direction of the arrows.

The shaft 36 has affixed to its upper end, by screws 76, a disc 78 on which conductive contacts 80 are affixed at equi-angular intervals by screws 82. The disc 78, together with its contacts, forms a rotary contact unit which can be replaced by any one of a variety of other units as illustrated in FIGS. 5 to 9, inclusive. Each contact in FIG. 3 is formed of conductive spring material and includes a contact plate 84 which is glazed or silver soldered. The plate 20, through insulating blocks 86, supports stationary, equiangularly spaced contacts 88. The plate 20 together with its contacts forms a stationary contact unit which can be replaced by any one of a variety of other stationary units as illustrated in FIGS. 5 to 9, inclusive. Each contact 88 of FIG. 3 is secured in place on the plate 20 by a plurality of screws 90. Each contact 88 is divided into two tongues 92 and 94, the former being wider than the latter so that the tongues will have dissonant natural vibration frequencies and will not act in harmony with one another to build up vibrations of large amplitudes.

As will be seen, the combination of FIGS. 1 to 4 constitute a three pole, alternating current, single throw, electromagnetic relay. Such an apparatus is adapted for use in controlling three phase electrical equipment. The two windings 72 may be connected in either parallel or series. The connection of these two coils has to be such that the flux originating from them is at all times essentially in the same direction going through the pole pieces, from one pole piece 70 through the armature to the other pole piece. The direction of the flux is hereby, of course, continuously changing with the flux of the existing voltage.

In this way a force is continuously moving the armature into the pulled in position. This causes the armature 48 to be swung from the full line position of FIG. 1 into alignment with the pole pieces 70 as illustrated in broken lines in the same figure, and to close all three sets of contacts. As the voltage applied to the coils declines to zero, the spring tends to open the contacts, but as the voltage passes through zero and builds up in the opposite sense the armature is again drawn into alignment with the pole pieces. The contacts 84 and 80 are made long so that they can have extensive relative movement while maintaining effective the circuits which they control.

Normally the two coils 72 will be identical, although they may be wound in the same or in opposite directions as desired. In either case they may be connected either in series or in parallel to a source of alternating current. The wiring connections are so chosen that the fluxes through the rotor produced by the respective windings will be mainly in the same direction.

Figure 5:
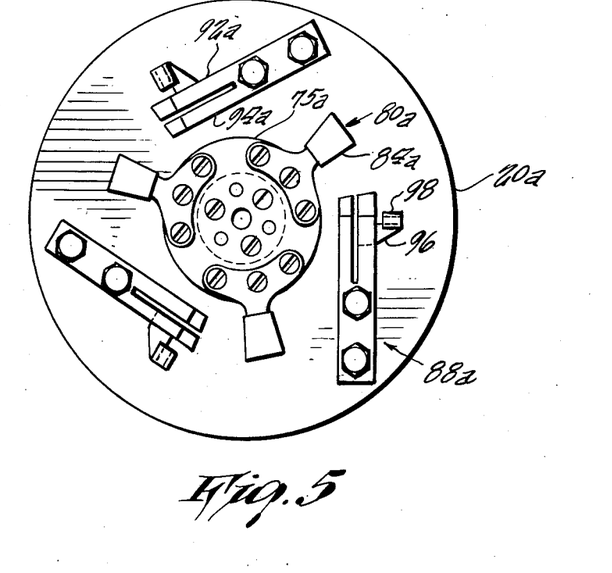
FIG. 5 is a view generally like FIG. 3 but showing the contacts of a three pole, single throw relay which is modified in some features as compared with FIG. 3.

The structure of FIG. 5 is generally like that of FIGS. 1 to 4, save that the contacts are altered. In FIG. 5 the movable contacts 80a, carried by a rotary disc 78a are generally like the contacts 80 of FIG. 3. The stationary contacts 88a, carried by plate 20a, are generally like the contacts 88 of FIG. 3, but differ in that each is provided with an offset arm 96 having a lug 98 integral with it. When the contacts are closed, the body 80a and the tip portion 84a of a movable contact pass between the tongues 92a and 94a on the one hand and the lug 98 on the other. The provision of the arm and lug add materially to the current carrying capacity of the contacts.

Figure 6:
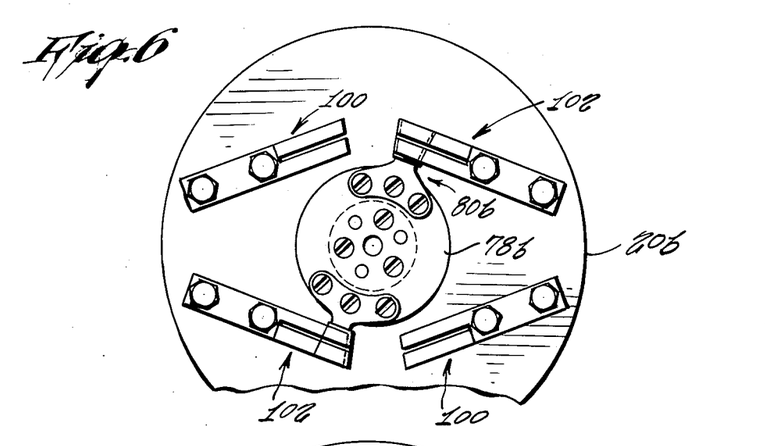
FIG. 6 is a view generally like FIG. 3 but showing the contacts of a two pole, double throw relay.

In FIG. 6 the construction is generally like that of FIGS. 1 to 4, but in this instance a two pole double throw arrangement is provided, the movable contacts being shown in the energized positions. Two movable contacts 80b are provided on the rotatable disc 78b, these contacts being the same in structure and mounting as the contacts 80a of FIG. 5, but being disposed at diametrically opposite points on the discs. Two stationary contacts 100, like the stationary contacts 88 of FIG. 3, are provided on a stationary plate 20b for engagement by the respective contacts 80b in the unenergized condition of the coils, and two stationary contacts 102, like the stationary contacts 88 of FIG. 3, are provided on the plate for engagement by the respective contacts 80b in the energized condition of the coils.

Figures 7, 8, 9:
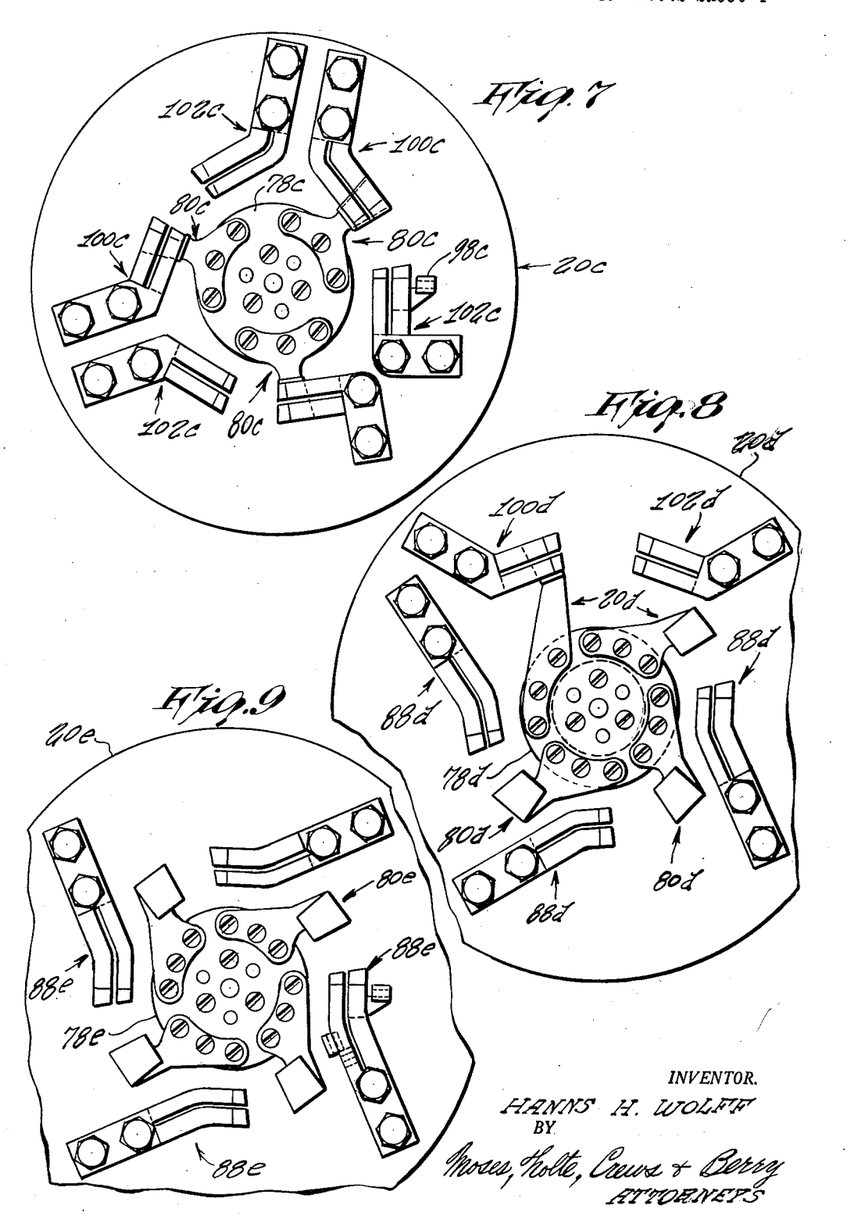
FIG. 7 is a view like FIG. 3 showing the contacts of a three pole, double throw relay.
FIG. 8 is a view like FIG. 3 showing the contacts of a combination of one single pole, double throw contact and three single pole, single throw contacts.
FIG. 9 is a view like FIG. 3 showing the contacts of a four pole, single throw relay.

FIG. 7 shows a three pole double throw arrangement as a further variation of FIGS. 1 to 4, the movable contacts being shown in the unenergized positions. Three movable contacts 80c are provided on a rotary disc 78c, these contacts being like the contacts 80a of FIG. 5. Three stationary contacts 100c are provided on a plate 20c for engagement by the respective contacts 80c when the coils are not energized, and three stationary contacts 102 are provided on the plate 20c for engagement by the respective contacts 80c when the coils are energized. The currents carried by the respective pairs of contacts are not necessarily the same. One of the contacts 102c is shown in FIG. 7 as provided with a lug 98c. Such variations may be resorted to whenever it is considered desirable.

FIG. 8 shows a structure like that of FIGS. 1 to 4, but involves a combination of a one pole, double throw arrangement and a three pole, single throw arrangement. Four movable contacts 80d, like the contacts 80 of FIG. 3, are secured at quadrangularly related points on a rotary disc 78d. One of the contacts 80d, shown as a little longer than the others, is made to engage a stationary contact 100d on a plate 20d when the coils are not energized, and to engage a stationary contact 102d on the plate 20d when the coils are energized. Further stationary contacts 88d are disposed on the plate 20d for engagement with the remaining respective contacts 80d when the coils are energized.

FIG. 9 also shows a structure like that of FIGS. 1 to 4, but involves a four pole, single throw arrangement. Four movable contacts 80c are provided on a rotary disc 78e. The contacts 80e are disengaged, as shown, when the coils are not energized, but are caused simultaneously to be engaged, respectively, with four stationary contacts 88e on a plate 20e when the coils become energized. Here again, one of the contact pairs is assumed to carry a substantially heavier current than the others and lugs 98e are shown provided on the involved stationary contact 88e for engagement by the cooperative movable contact 80e.

FIGS. 10 to 13 illustrate four different modifications of the structure of FIGS. 1 to 4.

Figures 10, 11, 12, 13:
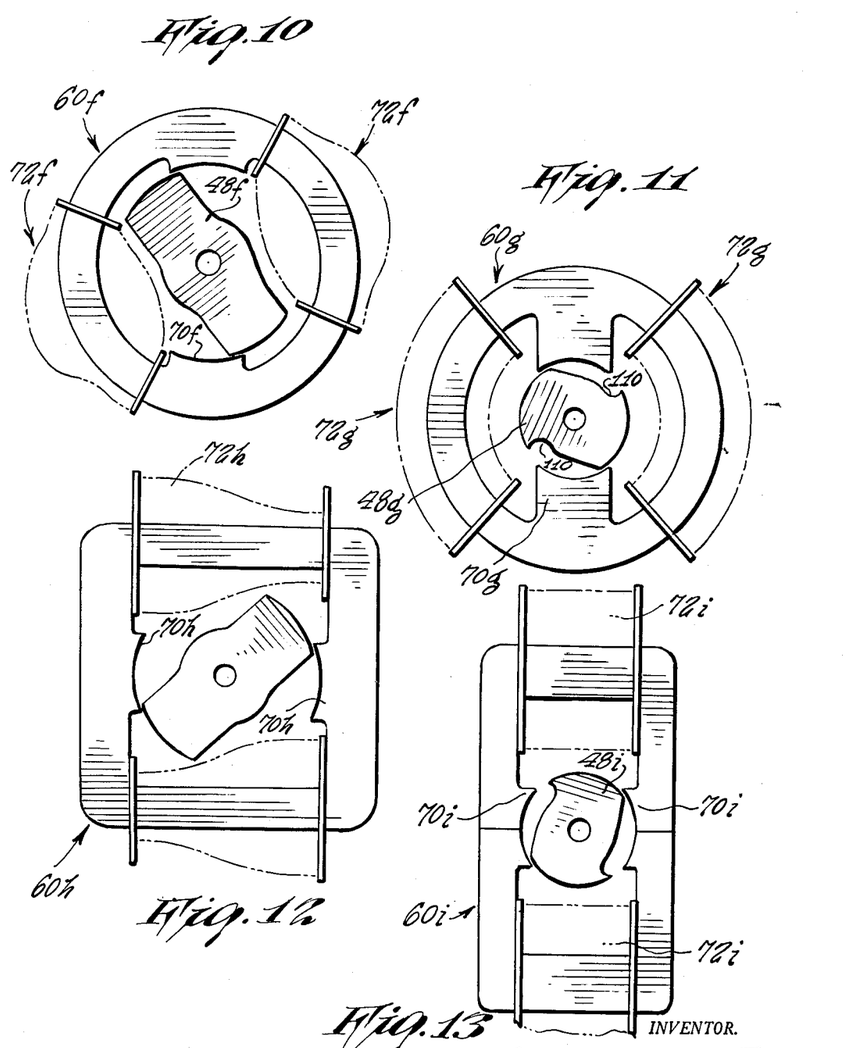
FIGS. 10 to 13, inclusive, are views in elevation illustrating different modified forms of stator and rotor combinations.

In FIG. 10 the ring 60f is the same as the ring 60 of FIGS. 1 to 4 and the armature 48f is the same as the armature 48 of FIGS. 1 to 4. The windings 72f are different in that the dispositions of the coil turns at the outer sides of the ring are not symmetrical wtih respect to the lengths of the coils. In all other respects the construction may be like that of FIGS. 1 to 4.

FIG. 11 is like FIGS. 1 to 4, save that the coils 72g are of uniform diameter, the pole pieces 70g extend in further, and the armature 48g is changed in shape. The armature 48g is made of smaller radius than in the preceding figures, and is designed to have a wide angle of turn. In order to get a large angle of rotation, as close as possible to 90°, the armature 48g is formed with undercut recesses 110. Providing the rotor with pole faces having undercuts permits a very wide angle of rotation, because the dissimilarity of forces acting on the rotor in opposite directions can be made considerable, even at a large angle from the final position.

The circular form of ring, as disclosed in FIGS. 1 to 4, 9 and 10, is especially advantageous in connection with the pole shoe forms shown in FIGS. 10 and 11.

The formation of the pole pieces with concave, arcuate faces has the advantage of providing a high starting torque, because a high change of inductance occurs in the starting range.

In FIG. 12 the ring 60h is square, the armature 48h is of the same shape as in FIG. 1, and the windings 72h are made of varying diameter in order to provide the desired clearance for the armature. The rectangular form of ring is especially suitable for reducing the size of the total structure while permitting the use of relatively large coils.

In FIG. 13 the ring 60i is rectangular but not square. The pole pieces 70i are provided midway of the longer sides of the ring 60i. With this type of construction the windings 72i may be enlarged to any size desired, simply by lengthening the ring 60i to accommodate the windings. The ring 60i may, if desired, be made in two equal pieces, being divided midway of its length as shown. The armature 48i is the same as the armature 48g of FIG. 11.

The elongated form of ring is especially suited for use with circular pole shoe faces.

In FIGS. 14 to 16 and 21 and in FIGS. 17 to 19 and 25 disclosure is made of closely similar rotary, alternating current solenoids which embody features of the invention. These forms of construction are compact and light in weight, and provide high resistance to shock and vibration.

The solenoid 120 of FIGS. 17 to 19 and 25 comprises flanged casing members 122 and 124, which are secured to one another by driven pins 126 after the assembly of the contained parts has been completed. The casing member 124 is provided with terminals at the top. A rotor shaft 128 is rotatively mounted on bearing bushings 130 and 132. The shaft extends rotatively through a collar 134 to the exterior of the casing for connection to any suitable operated member. The armature 136 comprises a laminated block 138 of highly permeable material which is fixed on the shaft, and recessed end plates 140 into which the bushings 130 and 132 extend. The bushings limit axial movement of the armature and the shaft.

Figure 17:
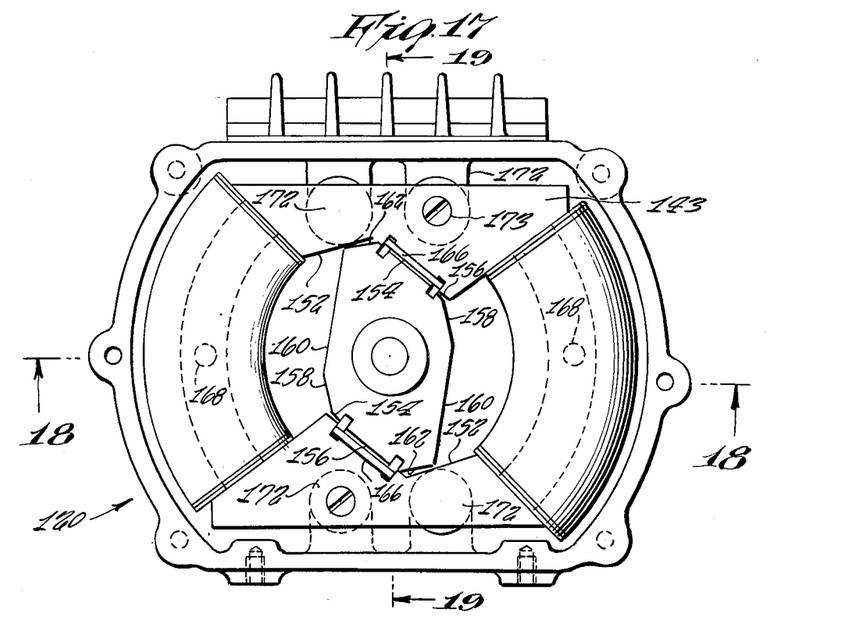
FIG. 17 is a view in elevation of a solenoid, generally similar to the solenoid of FIGS. 14 to 16, with one of the casing members removed.

The casing also encloses a stator 142. The stator 142 comprises a ring 143, which consists of a laminated body 144 of highly permeable material and steel end plates 146 which are secured to the body members 144 and to one another by rivets 148. The ring includes diametrically opposed arcuate sections upon which coils 150 are wound. The ring also includes joining portions which extend from one arcuate portion to the other. Each joining portion may have a straight outer face as shown, but it is formed with straight, angularly related inner faces 152 and 154, the latter faces constituting the faces of the pole pieces. The faces 152 and 154 desirably form an angle of the order of 125° with one another. The rotor, as seen in FIG. 17, is in the form of an irregular octagon, being formed with opposed pairs of parallel faces 156—156, 158—158, 160—160 and 162—162, as shown. The faces 156 and 162 desirably form an angle of the order of 125° with one another. The disposition of the faces of the rotor relative to the faces 152 and 154 of the stator is such that energization of the coils 150 causes torque to be applied to the armature until the faces 156 have been carried into continuous contact with the pole faces 154 of the stator, as shown in FIG. 17. In this condition of the parts the faces 162 have been carried through the condition of parallelism with the faces 152 and into divergent relation to the faces 152, as shown.

Each stator face 154 of the ring 143 is formed with channels 164 to receive a brass ring 166 which serves as a shading coil. The shading coils operate to produce a magnetic shift of phase of a portion of the main flux through the magnetic system to such a degree as to importantly reduce the tendency to hum or chatter. Each rotor face 156 has channels 165 formed in it corresponding to the shading coil channels 164. In the fully actuated condition illustrated in FIG. 17 the channels 165 stand opposite the channels 164.

The purpose of shading coils is to reduce the chattering of the rotor in the end position. It is effective in accomplishing this result, because the magnetic flux to the pole shoes is made to consist of two or more streams which have a phase shift against each other and thereby reduce the fluctuation of the forces acting between the pole shoes.

The ring 143 is formed with bores 168 through which it is attached to the casing member 124. Headed screws 170 have comparativley large unthreaded shank portions passed through the ring and into bores formed in embossed areas 172 of the casing member 124. Reduced threaded end portions of the screws 170 extend through the casing 124 and have clamping nuts 174 threaded upon them. The casing member is provided with two pairs of bosses 172 which may be alternatively used, according to whether clockwise or counterclockwise actuation of the rotor is wanted in response to the magnetomotive force.

Figures 14, 15, 16, 16A:
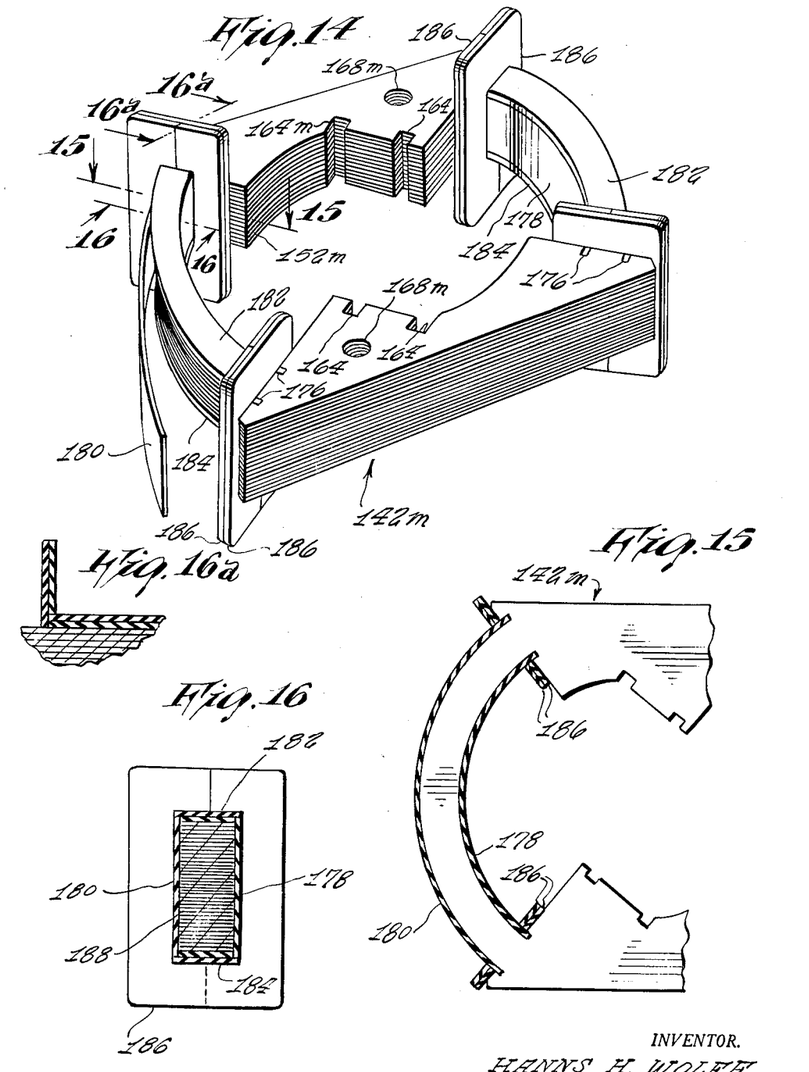
FIG. 14 is a perspective view of the stator of a rotary solenoid as shown in FIGS. 14 to 16, with one strip of external insulation shown swung away from its assigned position to reveal underlying structure.
FIG. 15 is a sectional view taken on the line 15—15 of FIG. 14, looking in the direction of the arrows.
FIG. 16 is a sectional view taken on the line 16—16 of FIG. 14, looking in the direction of the arrows.
FIG. 16a is a sectional view taken on the line 16a—16a of FIGURE 14, looking in the direction of the arrows.

The solenoid of FIGS. 17 to 19 and 25 also includes novel insulating features shown in FIGS. 14 to 16. As seen in FIG. 14, the connecting portions of the ring have substantially radial faces disposed toward the arcuate portions of the ring. Vertical channels 176 are provided in these faces to receive the extremities of inner and outer insulating strips 178 and 180. Upper and lower arcuate insulating strips 182 and 184 are provided to cover the top and bottom faces of the arcuate portions of the ring and to space the ring from its associated coil (not shown).

A pair of retaining plates 186 is provided at each end of each arcuate portion of the ring 143, the plates 186 being also formed of semi-flexible insulating material. Each plate 186 is of generally rectangular form and is formed with a rectangular opening 188 which is shaped to receive and snugly fit upon the insulating strips 178, 180, 182 and 184 which surround an arcuate section of the ring 143. Each plate 186 is split at 190 along its vertical median line at one end of the opening 188, the split extending from the opening through the nearest outer edge of the plate. Each plate 186 is sufficiently deformable to permit it to be placed around the ring as shown, but is sufficiently elastic to recover its original shape when so applied. Two plates 186 are employed at each end of each arcuate ring portion, one plate having its split disposed at the lower side and the other at the upper side. When strips 178 and 180, and the outer plates 186 have been placed upon an arcuate ring section, it is a simple matter to apply the insulating strips 182 and 184 and then to apply the inner plates 186. The coil cannot shake loose from the magnetic core, because the insulating parts are embedded in the laminations. It has to break into pieces before it can get loose.

The pole piece configuration disclosed in FIG. 14 has the advantage that a good starting and good end torque may both be realized. This is because the starting torque is mainly controlled by one pole piece section whereas the end torque is mainly controlled by the other pole piece section.

FIGS. 20 to 24, inclusive, show five different variations in the structure of the solenoid of FIGS. 17 to 19 and 25. In each instance, it is to be understood that the casings, which are not shown, are constructed according to the principle of the casing in FIGS. 17 to 19, but the contour of the casing is varied as required to accommodate the different shapes of stators illustrated.

Figure 18:
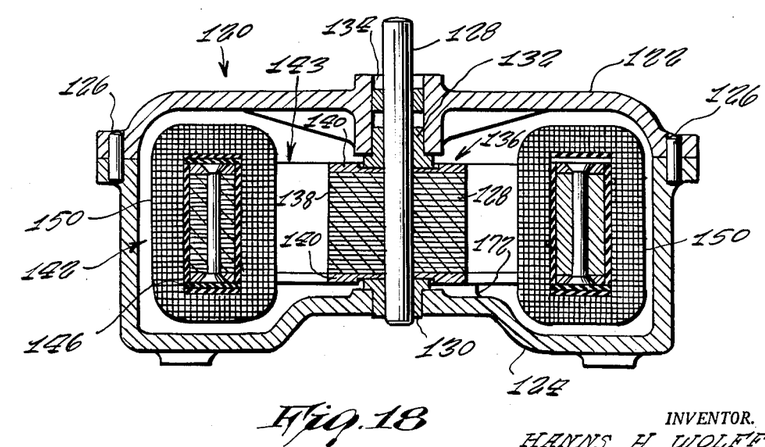
FIG. 18 is a sectional view taken on the line 18—18 of FIG. 17, looking in the direction of the arrows but showing both casing members, together with other parts.
Figure 19:
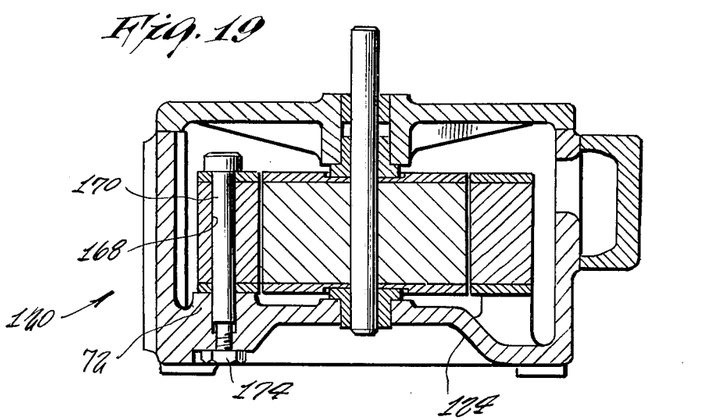
FIG. 19 is a sectional view taken upon the line 19—19 of FIG. 17, looking in the direction of the arrows, but showing both casing members together with other parts.
Figures 20, 21:
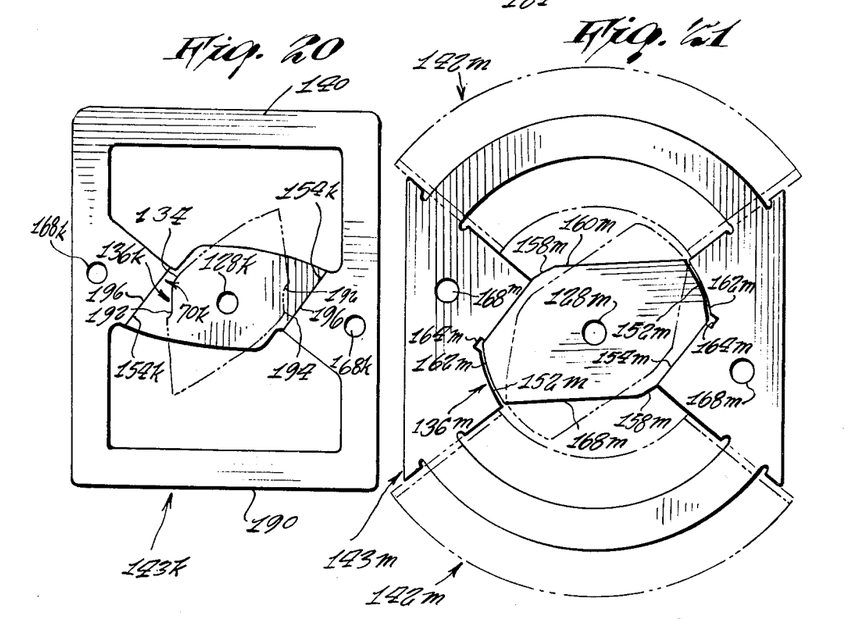

In the solenoid of FIG. 20 the rotor and stator are changed in shape as compared with the corresponding parts of FIGS. 17 to 19. The mounting is necessarily altered in shape to accommodate the changed stator. The stator comprises a laminated ring 143k of highly permeable material which is rectangular in form. Windings (not shown) are provided on opposite parallel arms 190 of the ring. The other parallel arms include pole pieces 70k which extend obliquely inward as shown.

The armature 136k is of the construction already described in connection with FIGS. 14 to 19, but is changed in shape as shown. The armature is generally of substantially the form of an oblique parallelogram but is formed with notches 192 and rounded corners 194. The design is such that energization of the windings will continuously produce a clockwise torque upon the rotor until the faces 196 of the armature have been carried into juxtaposition to the plane pole piece faces 154k as shown. The plane pole piece faces have the advantage of producing a high end torque in a structure of small dimension.

In the solenoid of FIGS. 14 to 16 and 21 the construction is generally like that of FIGS. 17 to 19. The stator 142m is substantially the same as the stator 142 of FIG. 18. The ring 143m is altered, however, in that the faces 152m are rounded in shape and concentric with the rotor instead of flat, and channels 164m are provided at the junctions of the faces 152m with the flat faces 154m.

The rotor 136m is also of similar but somewhat altered shape as compared with the rotor 136 of FIGS. 17 to 19. Faces 156m, 158m and 160m are the same, or substantially the same as the faces 156, 158 and 160 of FIGS. 14 to 19, but the faces 152m are made arcuate and of somewhat less extent than the faces 152.

Figure 22:
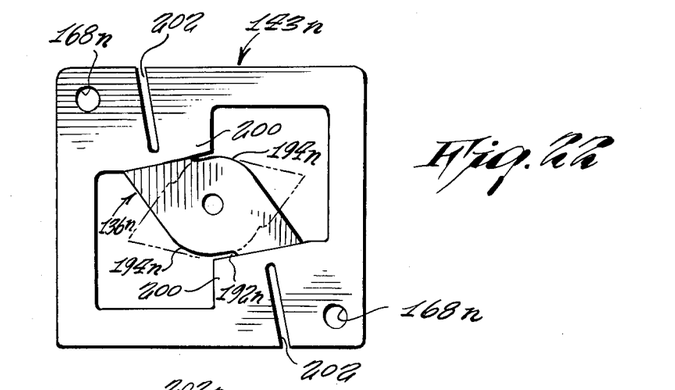
Figure 23:
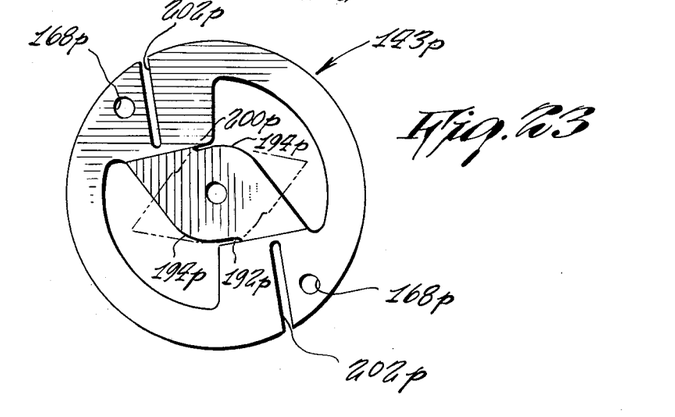

FIGS. 22 and 23 show shading coil free constructions for an A.C. solenoid in which the phase shift between two separate fluxes (separated by the slots 202 and 202p, respectively) is created by the phase shift between the two coils which are actuating the solenoid. This phase shift, when operated from the same source, can be accomplished, for example, by connecting two coils in series and shunting one of the coils by a capacitor.

Such a design is especially suited for higher operating frequencies, especially for 200 c.p.s. and over.

In FIG. 22 the stator and the rotor are further altered in shape. The stator ring 143n is rectangular in form. In two opposite quadrants the ring is open to provide for the reception of windings, but in the other quadrants the ring is almost solidly filled in to provide pole pieces 200.

The segments in which the pole pieces are formed are provided with deep slots 202.

The armature 136n has the general form of an oblique parallelogram but is formed with recesses 192n and rounded corner 194n.

In FIG. 23 the structure is like that of FIG. 22, save that the stator ring 143p is round. The segments in which the pole pieces 200p are formed are provided with deep slots 202p. The rotor 136p is the same as the rotor 136n.

Figure 24:
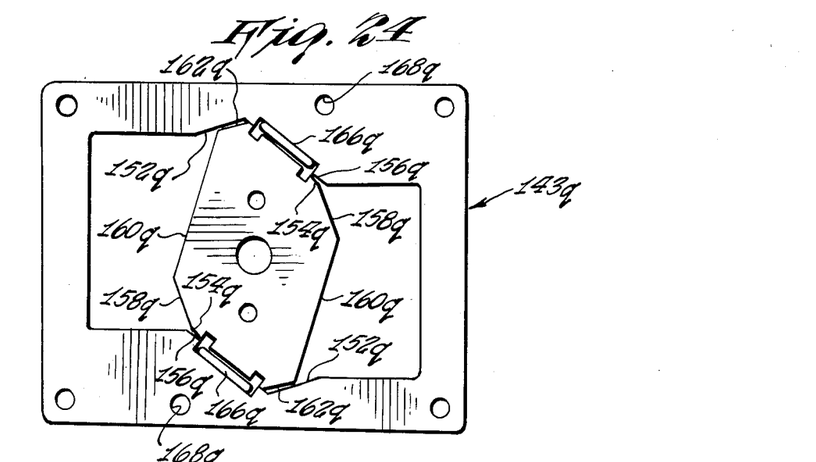
Figure 25:
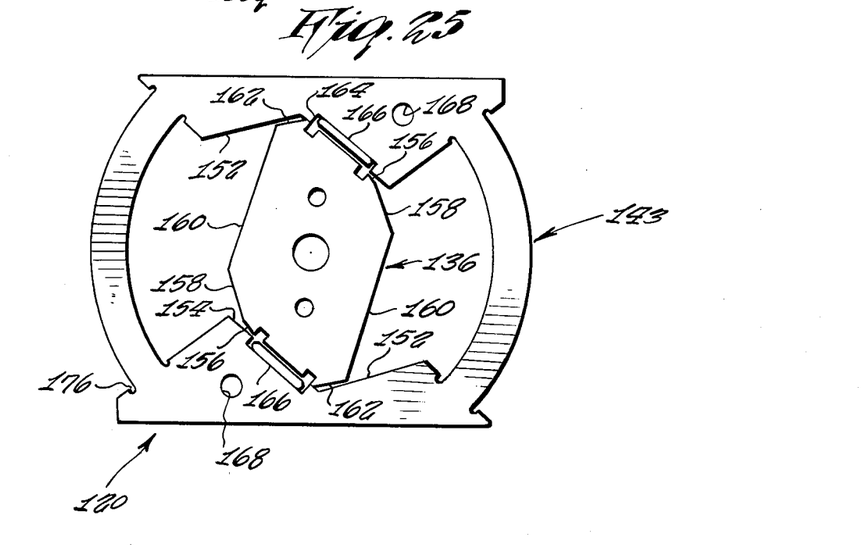
FIG. 25 is a view in elevation showing the stator-rotor combination of FIGS. 17 to 19.

In FIG. 24 the structure is like that of FIG. 25, save that the stator ring 143q is rectangular. The armature 136q is the same as the armature 136 of FIG. 25. Corresponding parts with the subscript "q" added in each instance, and no further detailed description will be given.

Figure 26:
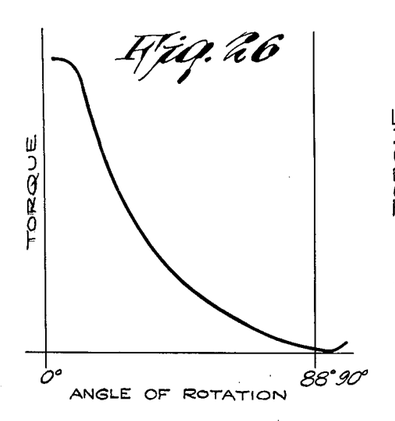
FIG. 26 is a diagram showing graphically the law of variation of torque with extent of operation of the armature of FIGS. 11 and 13.

The structures illustrated as adapted to produce a wide variety of desirable operating conditions. As will be seen in FIGURE 26, the structures of FIGS. 11 and 13 are characterized by a high initial clockwise torque which diminishes as the armature moves in a clockwise direction. The high torque at first diminishes sharply, but as the operation proceeds the diminution becomes more and more gradual until the slope of the torque curve becomes substantially zero at the end of 88° of operation. This result is assured chiefly through the forming of the pole pieces as shown.

A generally similar curve would apply to the structures of FIGS. 10 and 12. In the latter case however, the operating range is limited to 30°. If the point marked 88° in FIGURE 26 were instead marked 30° (increasing the horizontal scale by approximately 200%) the curve of FIGURES 11 and 13 would be applicable to FIGURES 10 and 12.

Figure 27:
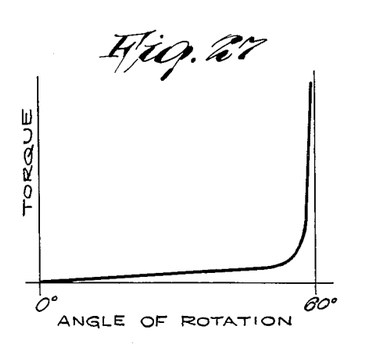
FIG. 27 is a similar diagram covering the structure of FIG. 20.

The diagram of FIGURE 27 shows that the low of torque variation for the structure of FIGURES 20, 22, and 25 is broadly the opposite of that of FIGURES 10 to 13. The torque is initially very low and increases slowly but steadily throughout all but the last part of the operating range. Then it shoots up abruptly as indicated.

Figure 28:
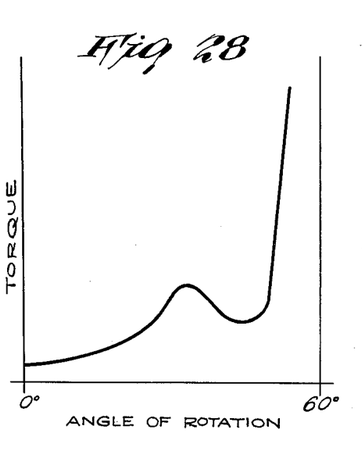
FIG. 28 is a diagram showing a combination of the diagrams of FIGS. 26 and 27, and covering the structure of FIG. 21.

FIGURE 28 shows the law of torque variation with angular extent of operation for the structure of FIGURES 14, 15, 16, and 21. Throughout the first two-thirds of the operating range the torque increases slowly but at a progressively sharper inclination, then levels off, turns down, again levels off and turns sharply upward.

Figure 29:
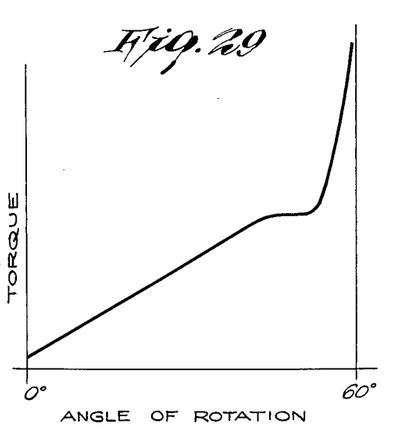
FIG. 29 is a still further diagram of the same kind, covering the structure of FIGS. 14 to 19 and 25, and also the structure of FIG. 24.

FIGURE 29 shows the law of torque variation with angular extent of operation for the structure of FIGURES 17, 18, 19 and 25 and for the structure of FIGURE 24. In these structures the torque rises at a steady rate as the rotor turns clockwise until substantially four-fifths of the operating range has been traversed. At that point the torque curve levels off for a short angular space and then turns sharply upward as shown.

I have described what I believe to be the best embodiments of my invention. I do not wish, however, to be confined to the embodiments shown, but what I desire to cover by Letters Patent is set forth in the appended claims.

I claim:

1. A rotary electromagnetic actuator comprising, in combination, an unpolarized rotor and a stator, said stator including a permeable ring having pole piece sections directed inwardly toward one another and a winding disposed around said ring on each side of the pole piece sections, said rotor and said stator pole piece sections having pole piece faces which cooperate to define an air gap therebetween during the rotary travel of said rotor, said rotor comprising a central rotary shaft and a highly permeable laminated armature thereon, said stator being substantially the same vertical thickness as said rotor, and said rotor being suspended within said stator with opposed faces disposed radially outward toward said opposed faces of said stator pole piece sections in an energized position, and means for returning the rotor from its energized to an unenergized position displaced therefrom, each of the pole faces of said rotor and each of the pole faces of said stator being disposed on a plane making an angle of the order of 125 degrees with one another, the plane face of one of said stator pole piece portions being formed with parallel slots and a shading coil disposed in said slots and wherein said pole pieces are disposed diametrically opposite one another.

2. A rotary electromagnetic actuator comprising in combination, an unpolarized rotor, a stator, said stator including a permeable ring having pole piece sections directed inwardly toward one another and at least two windings disposed around opposite segments of the ring independent of the pole piece sections and separated by the pole piece sections, each of said pole sections having a plane face disposed toward said rotor, said rotor comprising a central rotary shaft and a highly permeable laminated armature mounted on said shaft and being suspended within the stator winding with its pole faces directed outwardly toward said stator pole faces, said stator being formed with a deep slot in each pole section which enters the pole piece section from the outside and cuts nearly through to the plane face thereof which is disposed toward said rotor, and means for returning the rotor from its energized to its unenergized position.

3. A rotary alternating current electromagnetic actuator as set forth in claim 2, in which said stator is a substantially circular ring, having windings wrapped around the ring whereby the windings have the same circular axis as the ring.

4. A rotary alternating current electromagnetic actuator as set forth in claim 3, wherein the windings are small at the end and bulge in the center whereby coils of great length and numerous turns may be employed in conjunction with an armature having a comparatively narrow range of movement, said casing including recesses to receive the bulging winding.

5. A rotary electromagnetic actuator comprising, in combination, an unpolarized rotor, a stator, said stator including a permeable ring having pole piece sections directed inwardly toward one another, at least two windings disposed around opposite segments of the ring, separated by the pole piece sections, said stator being substantially the same thickness as said rotor, said rotor being suspended within the stator windings, said rotor comprising a central rotary shaft and a highly-permeable laminated armature fast thereon, said shaft extending outwardly from said rotor through said stator at each end of said stator, a casing including a central body section which surrounds said stator and end sections which respectively surmount the opposite ends of said shaft and which are detachably secured to the central casing section, a spring located in one end section and connected to the shaft to bias the rotor toward a nonoperative position, a rotary contact unit carried by the opposite end of the shaft beyond said stator, and a stationary contact unit carried by the casing in position to cooperate with the rotary contact unit, the construction and arrangement being such that different desired combinations of rotary and stationary contact units can be embodied at will in a given actuator.

6. A rotary electromagnetic actuator comprising a substantially annular stator having at least two diametrically opposite inwardly directed pole piece sections, a winding disposed around said stator on each side of said pole piece sections, an unpolarized rotor rotatably mounted centrally of said stator and including pole faces disposed in opposition to said stator pole piece sections and in alignment therewith when said actuator is energized, and means to bias said rotor away from the energized position, said rotor including symmetrically arranged pole piece sections having convex arcuate end faces complementary in form to the arcaute faces of the stator pole piece sections, the pole piece sections of the rotor being undercut on their lateral faces which trail as the rotor moves to actuated position, the undercuts being located in proximity to the convex end faces of the rotor pole piece sections.

7. A rotary electromagnetic actuater comprising a substantially annular stator having at least two diametrically opposite inwardly directed pole piece sections, a winding disposed around said stator on each side of said pole piece sections, an unpolarized rotor rotatably mounted centrally of said stator and including pole faces disposed in opposition to said stator pole piece sections and in alignment therewith when said actuator is energized, and means to bias said rotor away from the energized position, a shaft for said rotor extending through the stator and beyond the stator at both its opposite ends, a casing having a central or body section surrounding the stator and end sections which respectively surround the opposite ends of the shaft and which are detachably secured to the central casing section, a spring located in one end section and connected to the shaft to bias the rotor toward a non-operated position, a rotary contact unit carried by the opposite end of the shaft beyond the stator, and a stationary contact unit carried by the casing in position to cooperate with the rotary unit, the construction and the arrangement being such that different desired combinations of rotary and stationary contact units can be embodied at will in a given actuator.

8. A rotary, alternating current, electromagnetic actuator as in claim 7, wherein said rotary contact unit includes a disc removably mounted on said shaft adapted to rotate with said shaft; a plurality of contacts carried by the disk, all of said rotary unit contacts being formed of conductive strips of spring metal, said rotary unit contacts each including body portions and inturned tip portions spaced from the body portions.

9. A rotary alternating current electromagnetic actuator as set forth in claim 8 in which said stationary contact unit includes a plurality of stationary contacts cooperating with said rotary unit contacts, all of said stationary contacts being formed of conductive strips of spring metal, said stationary contacts each including a pair of long tongues disposed side by side and of different widths so that they are caused to have dissonant characteristic vibration frequencies, one of said tongues having a side arm and an integral offset lug for increasing the conductivity of the contact.

10. A rotary electromagnetic actuator comprising an unpolarized rotor, a substantially annular stator having inwardly extending diametrically opposite pole piece sections, a winding disposed around said stator being located between said pole piece sections, said rotor including a highly permeable laminated armature having end faces substantially coextensive with and in alignment with said pole piece sections when the latter is energized, means to rotate said rotor out of alignment with said pole piece sections, a movable contact carried by said rotor, a stationary contact positioned in the path of said movable contact, and means to energize said stator, said stationary contact having at least two resilient metallic elongated tongues of different dissonant vibrating frequencies arranged with their forward ends extending downwardly into the path of said movable rotary contact to resiliently hold said rotary contact in the circuit making position.

11. A rotary electromagnetic actuator comprising an unpolarized rotor, a substantially annular stator having inwardly extending diametrically opposite pole piece sections, a winding disposed around said stator being located between said pole piece sections, said rotor including a highly permeable laminated armature having end faces substantially coextensive with and in alignment with said pole piece sections when the latter is energized, means to rotate said rotor out of alignment with said pole piece sections, a movable contact carried by said rotor, a stationary contact positioned in the path of said movable contact, and means to energize said stator, said stationary contact having at least two resilient metallic elongated tongues arranged with their forward ends extending downwardly into the path of said movable rotary contact to resiliently hold said rotary contact in the circuit making position and said stationary contact including a lug contact positioned at one side of said tongues and engageable by said movable contact with said tongues.

12. A rotary electromagnetic actuator comprising an unpolarized rotor, a substantially annular stator having inwardly extending diametrically opposite pole piece sections, a winding disposed around said stator being located between said pole piece sections, said rotor including a highly permeable laminated armature having end faces substantially coextensive with and in alignment with said pole piece sections when the latter is energized, means to rotate said rotor out of alignment with said pole piece sections, at least two movable contacts carried by said rotor, at least two stationary contacts positioned in the path of said movable contacts and means to energize said stator, each said stationary contact having at least two resilient metallic elongated tongues of different dissonant vibrating frequency arranged with their forward ends extending downwardly into the path of said movable rotary contacts to resiliently hold said rotary contacts in the circuit making position, each stationary contact having a lug contact positioned alongside said tongues and engageable by said movable contact with said tongues.

13. A rotary electromagnetic actuator comprising an unpolarized rotor, a substantially annular stator having inwardly extending diametrically opposite pole piece sections, a winding disposed around said stator being located between said pole piece sections, said rotor including a highly permeable laminated armature having end faces substantially coextensive with and in alignment with said pole piece sections when the latter is energized, means to rotate said rotor out of alignment with said pole piece sections, at least two movable contacts carried by said rotor, at least two stationary contacts positioned in the path of said movable contacts, and means to energize said stator, each said stationary contact having at least two resilient metallic elongated tongues of different dissonant vibrating frequencies arranged with their forward ends extending downwardly into the path of said movable rotary contacts to resiliently hold said rotary contacts in circuit making position.

References Cited in the file of this patent

UNITED STATES PATENTS

| | | |
|---|---|---|
| 792,860 | Sundhl et al. | June 20, 1905 |
| 837,854 | Larson | Dec. 4, 1906 |
| 1,161,819 | Grob | Nov. 23, 1915 |
| 1,302,284 | Beall | Apr. 29, 1919 |
| 1,348,508 | Meden | Aug. 3, 1920 |
| 1,597,736 | Taeubert | Aug. 31, 1926 |
| 1,886,372 | Bossart | Nov. 8, 1932 |
| 2,028,263 | Warrick | Jan. 21, 1936 |
| 2,246,739 | Leach | June 24, 1941 |
| 2,289,227 | Walker | July 7, 1942 |
| 2,353,756 | Price | July 18, 1944 |
| 2,484,934 | Debrey | Oct. 18, 1949 |
| 2,562,091 | Harrison | July 24, 1951 |
| 2,563,271 | Price | Aug. 7, 1951 |
| 2,590,996 | Miloche | Apr. 1, 1952 |
| 2,635,155 | Barr | Apr. 14, 1953 |
| 2,671,863 | Matthews | Mar. 9, 1954 |

FOREIGN PATENTS

| | | |
|---|---|---|
| 158,994 | Great Britain | Feb. 15, 1921 |